United States Patent [19]
Vidal et al.

[11] Patent Number: 5,452,742
[45] Date of Patent: Sep. 26, 1995

[54] ELECTROPNEUMATIC POSITION CONTROLLER

[75] Inventors: Fausto C. Vidal, Langenselbold; Heinfried Hoffmann, Frankfurt; Lothar Kemmler, Moerfelden-Walldorf, all of Germany

[73] Assignee: Samson AG Mess- und Regeltechnik, Frankfurt, Germany

[21] Appl. No.: 128,600

[22] Filed: Sep. 29, 1993

[30] Foreign Application Priority Data

Oct. 3, 1992 [DE] Germany .......................... 42 33 299.0

[51] Int. Cl.⁶ ................................................. F15B 13/043
[52] U.S. Cl. ................................. 137/596.16; 137/625.44
[58] Field of Search ........................... 137/596.16, 625.44

[56] References Cited

U.S. PATENT DOCUMENTS

| | | | |
|---|---|---|---|
| 3,420,494 | 1/1969 | Egner | 251/129.03 |
| 4,516,604 | 5/1985 | Taplin | 137/596.16 X |
| 4,516,605 | 5/1985 | Taplin | 137/596.16 X |
| 4,540,020 | 9/1985 | Taplin | 137/596.16 X |
| 4,765,370 | 8/1988 | Ariizumi et al. | 137/625.44 X |
| 4,922,952 | 5/1990 | Kemmler. | |
| 4,925,498 | 5/1990 | Kemmler. | |

*Primary Examiner*—Gerald A. Michalsky
*Attorney, Agent, or Firm*—Hill, Steadman & Simpson

[57] ABSTRACT

Electropneumatic position controller having two solenoid operated pneumatic valves, each of which is respectively provided with a regulating pressure nozzle, an exhaust nozzle, a discharge line leading to a power amplifier, and a hinged armature that is driven by an electromagnetic system and alternatively closes the regulating pressure nozzle or the exhaust nozzle, characterized in that the solenoid valves each respectively comprise a channel that communicates with their exhaust nozzle and can be manually closed, the respective power amplifier being capable of being switched as a result of the closing of said channel even without electrical excitation of the magnet system.

10 Claims, 2 Drawing Sheets ized control air $P_{st}$. The power amplifier 19 receives pressurized supply air $P_{zul}$ for driving the element to be positioned.

ELECTROPNEUMATIC POSITION CONTROLLER

BACKGROUND OF THE INVENTION

The invention is directed to an electropneumatic controller having two solenoid operated pneumatic valves, each of which is respectively provided with a regulating pressure nozzle, an exhaust nozzle, a discharge leading to a power amplifier and a hinged armature that is driven by a magnet system and alternatively closes the regulating pressure nozzle or the exhaust nozzle.

The application of position controllers is described in German Utility Model No. G9110959 and German Patent Application DE-A13727008 corresponding to U.S. Pat. Nos. 4,922,952 and 4,925,498 incorporated herein by reference. Two solenoid valves are typically used for moving the final control element, such as a control valve element, from a first to a second position and to move the control element back from the second to the first position.

Such position controllers typically require auxiliary electrical energy, for example in order to be able to test the unimpeded movement of the adjustment device provided with the position controller in an early stage of assembly. This makes assembly more difficult, particularly when the assembler is not authorized to carry out the electrical connection of the device.

It is therefore desirable to fashion the initially cited, pneumatic position controller such that the position controller can be brought into any desired position, particularly into the upper and lower extreme position without auxiliary electrical energy. This is required, for example, for setting the zero point.

SUMMARY OF THE INVENTION

This object is inventively achieved in that the solenoid valves each comprise a channel that communicates with their exhaust nozzle and can be manually closed, the respective power amplifier being capable of being switched as a result of the closing thereof without electrical excitation of the magnet system.

The two channels are preferably brought together for being closed in common, whereby a push-button that is to be manually actuated and that closes the channel can be provided.

The invention shall be set forth below with reference to the drawings.

DETAILED DESCRIPTION OF THE PREFERRED EMBODIMENTS

Figure 1:
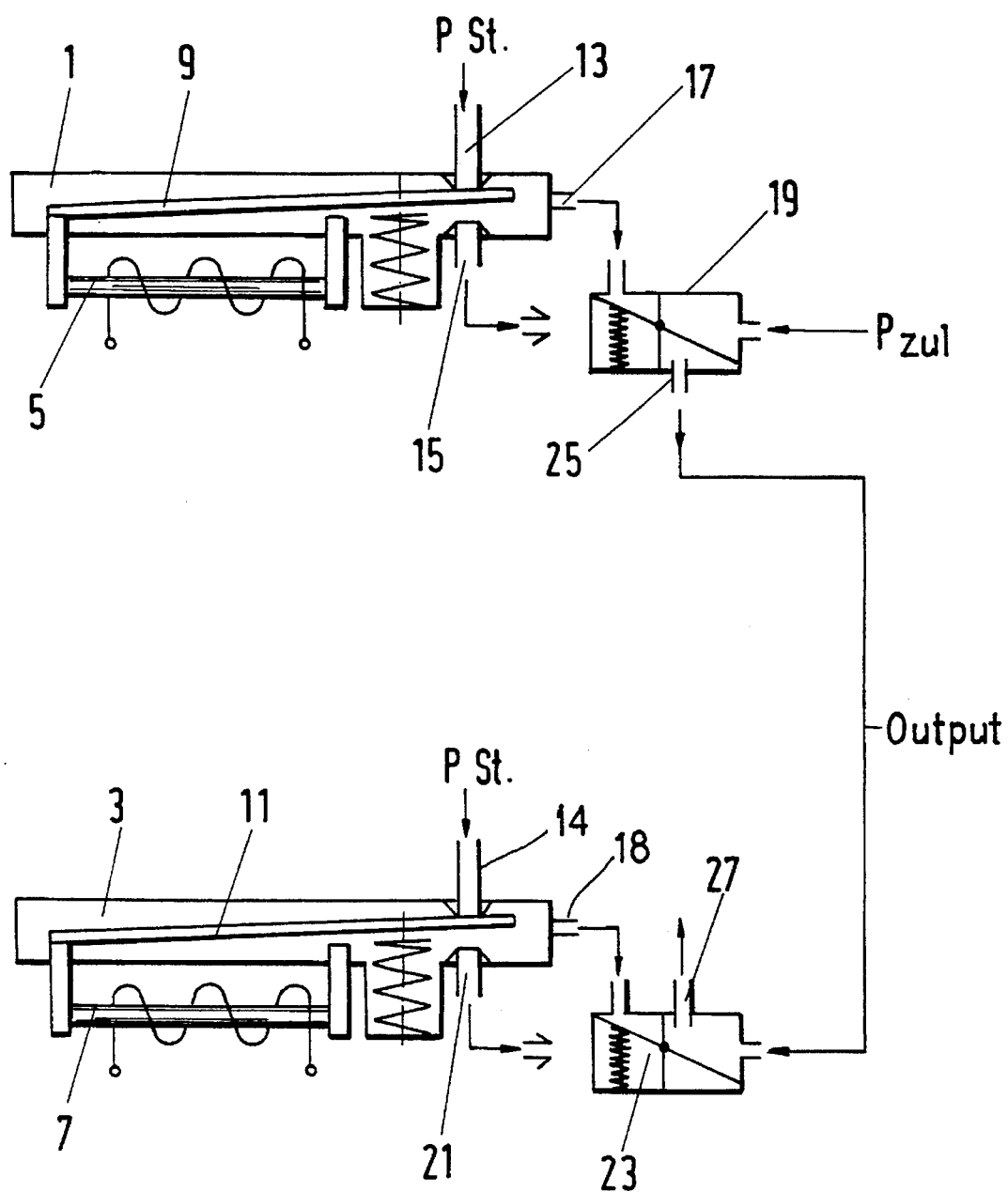
FIG. 1 is a schematic diagram of a pneumatic position controller of this type in accord with a first exemplary embodiment of the invention.

FIG. 1 schematically shows a pneumatic position controller. It is composed of two hinged armature solenoid valves 1, 3, each of which is provided with: a regulating pressure nozzle 13, 14, an exhaust nozzle 15, 21, a discharge 17, 18 leading to a power amplifier 19, 23, and a hinged armature 9, 11 that is driven by a magnet system 5, 7 that alternatively closes the regulating pressure nozzle 13, 14 or the exhaust nozzle 15, 21. The regulating pressure nozzles receive pressurized control air $P_{st}$. The power amplifier 19 receives pressurized supply air $P_{zul}$ for driving the element to be positioned. In the position shown in FIG. 1, wherein the electromagnetic systems 5, 7 of the solenoid valves 1, 3 are not excited, the hinged armatures 9, 11 close the regulating pressure nozzles 13, 14 respectively. Air emerging from the regulating pressure nozzles 13, 14 due to leaks do not cause a build up of pressure in the hinged armature solenoid valves 1, 3 since this entering air escapes through the exhaust nozzles 15, 21 respectively.

The exhaust nozzles 15, 21 are provided with channels that can be manually closed. Given such a manual closing—for example, by simply placing a finger thereon—, a pressure builds up in the hinged armature solenoid valves 1, 3 due to the inadequate seal of the regulating pressure nozzles 13, 14. After some time, this effects a switching of the power amplifiers or power switches 19, 23. The exhaust channel 27 is closed in the power amplifier 23 and the supply air pressure $P_{zul}$ is thus switched to the output via the channel 25 from the power amplifier 19: the positioning device is manually driven in this way.

When the nozzles 15 and 21 are again released, the drive, given a safety position prescribed by springs, proceeds into this safety position; given drives without springs, the drive remains in the respective position.

Figure 2:
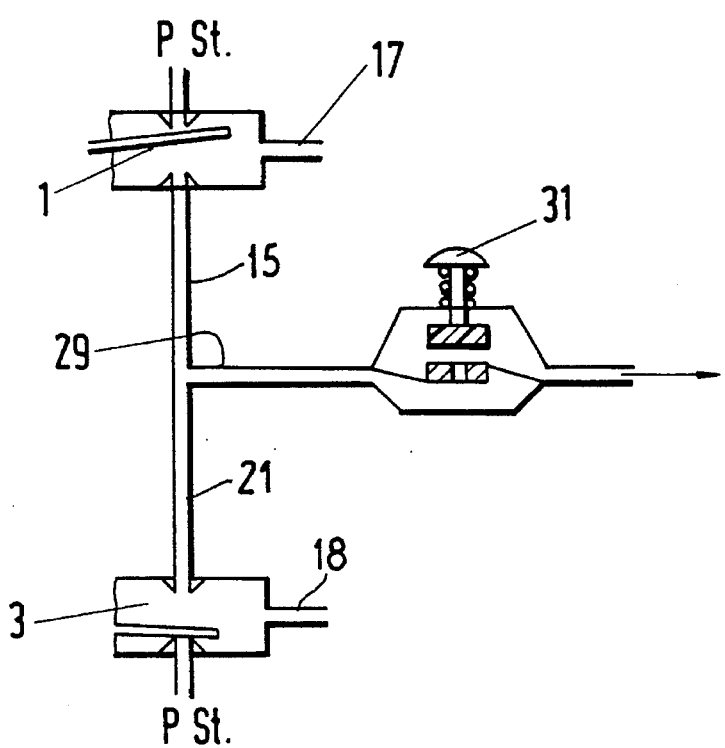
FIG. 2 is a schematic diagram of a pneumatic position controller in accord with a second exemplary embodiment of the invention.

In the exemplary embodiment of FIG. 2, the channels communicating with the nozzles 15, 21 are combined. A push-button 31 is provided via which the common exhaust line 29 can be closed in order to effect the displacement of the pneumatic drive that has just been set forth.

Figure 3:
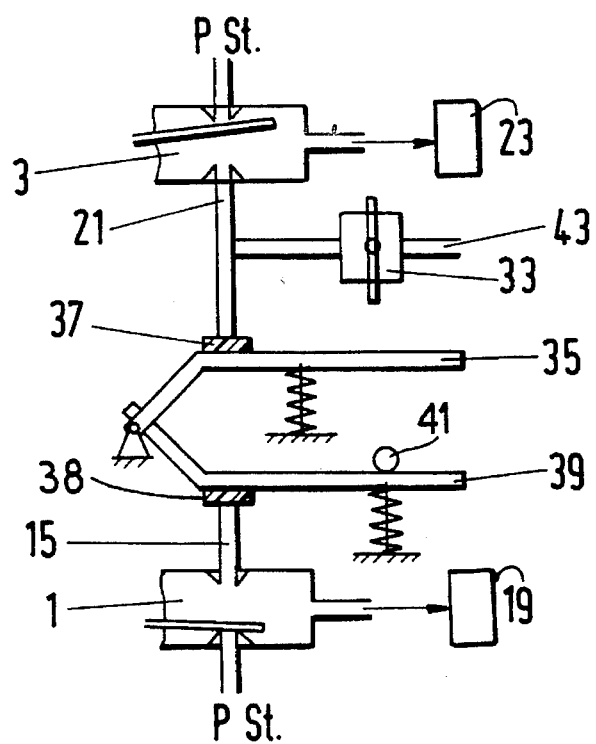
FIG. 3 is a schematic diagram of a pneumatic position controller in accord with a third exemplary embodiment of the invention.

In the exemplary embodiment shown in FIG. 3, the channels leading to the nozzles 15, 21 can be individually closed. A spring-loaded, first lever acts on a seal 37 that closes the channel leading to the nozzle 21. A second lever 39 acts on a seal 38 that is seated on the channel that leads to the nozzle 15. A ball valve 33 is provided in the channel leading to the nozzle 21. When the ball valve 33 is closed, a pressure builds up in the solenoid valve 3 since the lever 35 prevents the aeration of the solenoid valve 3. The power switch 23 shown in FIG. 1 is closed and the air is thus held in the drive. At the same time, the lever 39 is pressed against a detent 41, the solenoid valve 1 is aerated, as a result whereof the power switch 19 remains unswitched which closes the channel 25 for the supply air $P_{zul}$ to the drive.

When the ball valve 33 is closed, the drive is thus held in its momentary position, is aerated through the exhaust channel 27 by actuation of the lever 35, and is moved by the output air through line 25 against the force of the spring by pressing the lever 39. Instead of opening the ball valve 33 for normal operation, the lever 35 can also be held open via a catch. The ball valve 33 and the discharge line 43 can then be foregone.

The exemplary embodiment of FIG. 3 thus provides the possibility of moving the adjustment device manually and the possibility of retaining it in an arbitrary position.

Both individually as well as in arbitrary combinations, the features of the invention disclosed in the above specification, in the drawing, as well as in the claims can be critical for the realization of the various embodiments of the invention.

We claim as our invention:

1. An electropneumatic position controller comprising two power amplifiers, two solenoid operated pneumatic valves, each pneumatic valve having a regulating pressure nozzle, an exhaust nozzle, a discharge leading to one of said power amplifiers, and a hinged armature, electromagnetic means for driving said armature for alternatingly closing the regulating pressure nozzle or the exhaust nozzle, two channels respectively communicating with the exhaust nozzles and containing means for closing the channels, and pneumatic means for switching said power amplifiers as a result of the closing of said two channels without electrical excitation of the electromagnetic means.

2. An electropneumatic position controller according to claim 1, wherein the two channels comprise a common region forming a single channel and said means for manually closing when activated closes said single channel.

3. An electropneumatic position controller according to claim 2, wherein said means for closing comprises a pushbutton having a manually actuatable surface operable to close the single channel.

4. An electropneumatic position controller according to claim 1, further comprising means for holding the position controller in a selected arbitrary position.

5. The position controller according to claim 1, wherein said two channels comprise a first channel from said first exhaust nozzle, and a second channel from said second exhaust nozzle, and said means for closing comprises a first spring loaded valve normally biased in a position to hold open said first channel; and a second spring loaded valve normally biased to close said second channel.

6. The position controller according to claim 5, wherein said second channel further comprises a branch channel upstream of said second spring loaded valve, said branch channel leading to atmosphere and having a valve interposed therein.

7. The position controller according to claim 6, wherein said first spring loaded valve means comprises a seal applied to said first channel and an overlying lever spring loaded away from said first seal but depressible to effect a seal at said first channel;

and said second spring loaded valve means comprises a second seal arranged on said second channel and an overlying lever spring loaded to compress said second seal onto said second channel to effect a seal thereat.

8. An electropneumatic position controller, comprising: a first solenoid operated pneumatic valve having a first regulating pressure nozzle, a first exhaust nozzle, a first discharge nozzle, and a first hinged armature driven by an electromagnetic system for alternatively closing the first regulating pressure nozzle or the first exhaust nozzle;

a second solenoid operated pneumatic valve having a second regulating pressure nozzle, a second exhaust nozzle, a second discharge nozzle, and a second hinged armature driven by an electromagnetic system for alternatively closing the second regulating pressure nozzle or the second exhaust nozzle;

a first power amplifier having first and second chambers, a first control air inlet open into said first chamber, and a first supply air inlet into said second chamber, and a first supply air outlet from said second chamber, and a first switch acted on by pressure in said first chamber to open a flow pathway from said first supply air inlet to said first supply air outlet, and in the absence of pressure in said first chamber, closing the flow pathway between said first supply air inlet and said first supply air outlet, said first discharge nozzle flow connected to said first control air inlet of said first power amplifier;

a second power amplifier having third and fourth chambers, a second control air inlet into said third chamber, and a second supply air inlet into said third chamber, and a second outlet from said fourth chamber, and a second switch acted on by pressure in said third chamber to close a flow path between said second supply air inlet and said second outlet, and in the absence of pressure in said third chamber opens said path between said second supply air inlet and said second outlet, said second discharge nozzle flow connected to said second control air inlet of said second power amplifier;

said first supply air outlet of said first power amplifier flow connected to a drive air output of said position controller and to said second supply air inlet of said second power amplifier;

a channel connecting said first exhaust nozzle and said second exhaust nozzle and providing a means for selectively closing said first and second exhaust nozzles.

9. A position controller according to claim 8, wherein said means for closing comprises a valve member having a push button for selectively closing the valve member.

10. An electropneumatic position controller, comprising:

a first solenoid operated pneumatic valve having a first regulating pressure nozzle, a first exhaust nozzle, a first discharge nozzle, and a first hinged armature driven by an electromagnetic system for alternatively closing the first regulating pressure nozzle or the first exhaust nozzle;

a second solenoid operated pneumatic valve having a second regulating pressure nozzle, a second exhaust nozzle, a second discharge nozzle, and a second hinged armature driven by an electromagnetic system for alternatively closing the second regulating pressure nozzle or the second exhaust nozzle;

a first power amplifier having first and second chambers, a first control air inlet open into said first chamber, and a first supply air inlet into said second chamber, and a first supply air outlet from said second chamber, and a first switch acted on by pressure in said first chamber to open a flow pathway from said first supply air inlet to said first supply air outlet, and in the absence of pressure in said first chamber, closing the flow pathway between said first supply air inlet and said first supply air outlet, said first discharge nozzle flow connected to said first control air inlet of said first power amplifier;

a second power amplifier having third and fourth chambers, a second control air inlet into said third chamber, and a second supply air inlet into said third chamber, and a second outlet from said fourth chamber, and a second switch acted on by pressure in said third chamber to close a flow path between said second supply air inlet and said second outlet, and in the absence of pressure in said third chamber opens said path between said second supply air inlet and said second outlet, said second discharge nozzle flow connected to said second control air inlet of said second power amplifier;

said first supply air outlet of said first power amplifier flow connected to a drive air output of said position controller and to said second supply air inlet of said second power amplifier; and a means for selectively closing said first and second exhaust nozzles.

* * * * *